United States Patent
Kasahara

(10) Patent No.: US 10,074,216 B2
(45) Date of Patent: Sep. 11, 2018

(54) INFORMATION PROCESSING TO DISPLAY INFORMATION BASED ON POSITION OF THE REAL OBJECT IN THE IMAGE

(71) Applicant: SONY CORPORATION, Tokyo (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/025,500

(22) PCT Filed: Aug. 13, 2014

(86) PCT No.: PCT/JP2014/071386
§ 371 (c)(1),
(2) Date: Mar. 28, 2016

(87) PCT Pub. No.: WO2015/072194
PCT Pub. Date: May 21, 2015

(65) Prior Publication Data
US 2016/0210788 A1 Jul. 21, 2016

(30) Foreign Application Priority Data
Nov. 13, 2013 (JP) .................................. 2013-234930

(51) Int. Cl.
| | |
|---|---|
| G09G 5/14 | (2006.01) |
| G06T 19/00 | (2011.01) |
| G06T 11/00 | (2006.01) |
| G06F 3/0484 | (2013.01) |
| G06K 9/32 | (2006.01) |
| G06K 9/00 | (2006.01) |

(52) U.S. Cl.
CPC .......... *G06T 19/006* (2013.01); *G06F 3/0484* (2013.01); *G06K 9/00671* (2013.01); *G06K 9/3208* (2013.01); *G06T 11/00* (2013.01)

(58) Field of Classification Search
CPC ..................................................... G06T 19/006
USPC .......................................................... 345/633
See application file for complete search history.

(56) References Cited

U.S. PATENT DOCUMENTS

| | | | | | |
|---|---|---|---|---|---|
| 5,995,119 | A | * | 11/1999 | Cosatto | ................... G06T 13/40 345/473 |
| 6,012,069 | A | * | 1/2000 | Shibazaki | ......... G06F 17/30265 |
| 6,278,466 | B1 | * | 8/2001 | Chen | ....................... G06T 13/00 345/473 |
| 7,027,054 | B1 | * | 4/2006 | Cheiky | ................... G06T 13/40 345/473 |

(Continued)

FOREIGN PATENT DOCUMENTS

| | | |
|---|---|---|
| JP | 10-275161 A | 10/1998 |
| JP | 2005-055743 A | 3/2005 |

(Continued)

*Primary Examiner* — Javid A Amini
(74) *Attorney, Agent, or Firm* — Chip Law Group

(57) ABSTRACT

A display control device includes a record reference unit configured to refer to a record in which an image, an object included in the image, and a position where the object is displayed or an orientation of the object in the image are associated with one another; and a display controller configured to perform a transition from display of a first image including the object to display of a second image including the object based on the record while maintaining the position where the object is displayed or the orientation of the object, the second image being different from the first image.

12 Claims, 12 Drawing Sheets

(56) References Cited

U.S. PATENT DOCUMENTS

| | | | |
|---|---|---|---|
| 2007/0085820 A1* | 4/2007 | Suzuki | G06F 3/016 345/156 |
| 2008/0002225 A1* | 1/2008 | Iwasaki | G06F 3/1205 358/1.15 |
| 2008/0036766 A1* | 2/2008 | Ishii | G09B 29/12 345/427 |
| 2008/0158612 A1* | 7/2008 | Iwasaki | G06T 11/60 358/3.26 |
| 2009/0183115 A1* | 7/2009 | Iwasaki | G06F 17/30722 715/810 |
| 2010/0007665 A1* | 1/2010 | Smith | G06T 13/40 345/473 |
| 2012/0162204 A1* | 6/2012 | Vesely | G06F 3/0325 345/419 |
| 2012/0210254 A1* | 8/2012 | Fukuchi | G06F 3/012 715/757 |
| 2013/0135228 A1* | 5/2013 | Won | G06F 3/04883 345/173 |
| 2013/0215116 A1* | 8/2013 | Siddique | G06Q 30/0643 345/420 |
| 2013/0249948 A1* | 9/2013 | Reitan | G06F 3/011 345/633 |
| 2014/0121015 A1* | 5/2014 | Massing | G07F 17/3211 463/33 |
| 2015/0084951 A1* | 3/2015 | Boivin | H04N 5/272 345/419 |
| 2015/0123966 A1* | 5/2015 | Newman | G06T 19/006 345/419 |

FOREIGN PATENT DOCUMENTS

| | | |
|---|---|---|
| JP | 2007-280212 A | 10/2007 |
| JP | 2012-128485 A | 7/2012 |
| JP | 2013-105253 A | 5/2013 |

\* cited by examiner

FIG.4

| IMAGE ID | OBJECT ID | POSITION (X,Y) | ORIENTATION |
|---|---|---|---|
| img-000001 | obj-000001 | 0.276, 0.843 | M1 |
| img-000001 | obj-000002 | 0.791, 0.229 | M2 |
| ... | ... | ... | ... |

112

401a
401b

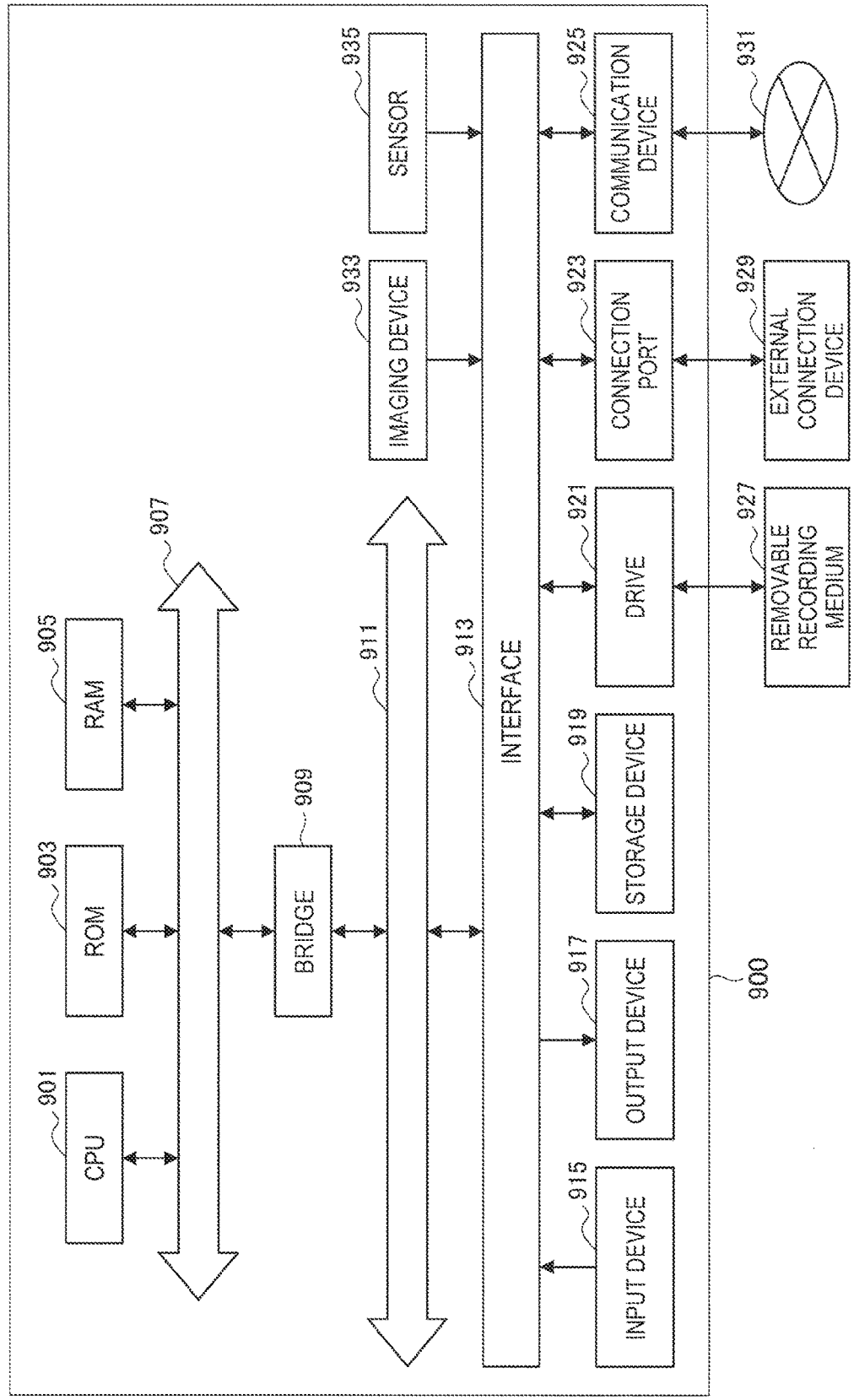

000
INFORMATION PROCESSING TO DISPLAY INFORMATION BASED ON POSITION OF THE REAL OBJECT IN THE IMAGE

TECHNICAL FIELD

The present disclosure relates to a display control device, a display control method, and a program.

BACKGROUND ART

In recent years, techniques called augmented reality (AR) for presenting a real image having additional information superimposed thereon to a user have gained attention. In the AR technology, for example, an object included in a captured image is recognized and information associated with the recognized object is displayed. Such information is also referred to as annotation and is visualized as various forms of virtual objects such as text, icon, and animation. An example of such AR technology is disclosed in, for example, Patent Literature 1.

CITATION LIST

Patent Literature

Patent Literature 1: JP 2013-105253A

SUMMARY OF INVENTION

Technical Problem

However, Patent Literature 1 discloses the technique for appropriately displaying a virtual object associated with a real object to be suitable for the position or orientation of the object, but it does not teach a display technology for utilizing a real object itself. As disclosed in Patent Literature 1, the position or orientation of an object can be detected, and thus such detection may allow a real object itself to be utilized, thereby displaying information that is more useful.

Therefore, in the present disclosure, there is provided a novel and improved display control device, display control method, and program, capable of displaying information that is more useful by utilizing a real object itself based on the position in which the real object included in an image is displayed or the orientation of the object.

Solution to Problem

According to the present disclosure, there is provided a display control device including: a record reference unit configured to refer to a record in which an image, an object included in the image, and a position where the object is displayed or an orientation of the object in the image are associated with one another; and a display controller configured to perform a transition from display of a first image including the object to display of a second image including the object based on the record while maintaining the position where the object is displayed or the orientation of the object, the second image being different from the first image.

According to the present disclosure, there is provided a display control method including: referring to a record in which an image, an object included in the image, and a position where the object is displayed or an orientation of the object in the image are associated with one another; and performing a transition from display of a first image including the object to display of a second image including the object based on the record while maintaining the position where the object is displayed or the orientation of the object, the second image being different from the first image.

According to the present disclosure, there is provided a program for causing a computer to execute: a function of referring to a record in which an image, an object included in the image, and a position where the object is displayed or an orientation of the object in the image are associated with one another; and a function of performing a transition from display of a first image including the object to display of a second image including the object based on the record while maintaining the position where the object is displayed or the orientation of the object, the second image being different from the first image.

Advantageous Effects of Invention

According to the present disclosure as described above, it is possible to display information that is more useful by utilizing a real object itself based on the position in which the real object included in an image is displayed or the orientation of the object.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is a diagram illustrating an example of a record generated in an image-object DB in an embodiment of the present disclosure.

FIG. 12 is a block diagram illustrating a hardware configuration example of an information processing apparatus according to an embodiment of the present disclosure.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be made in the following order.
1. Configuration of device
2. Display example
2-1. Change in position or orientation in which object is displayed
2-2. Transition between images
2-3. Display of annotation
2-4. Display of options of transition destination
3. Hardware configuration
4. Supplement (1. Configuration of Device)

Figure 1:
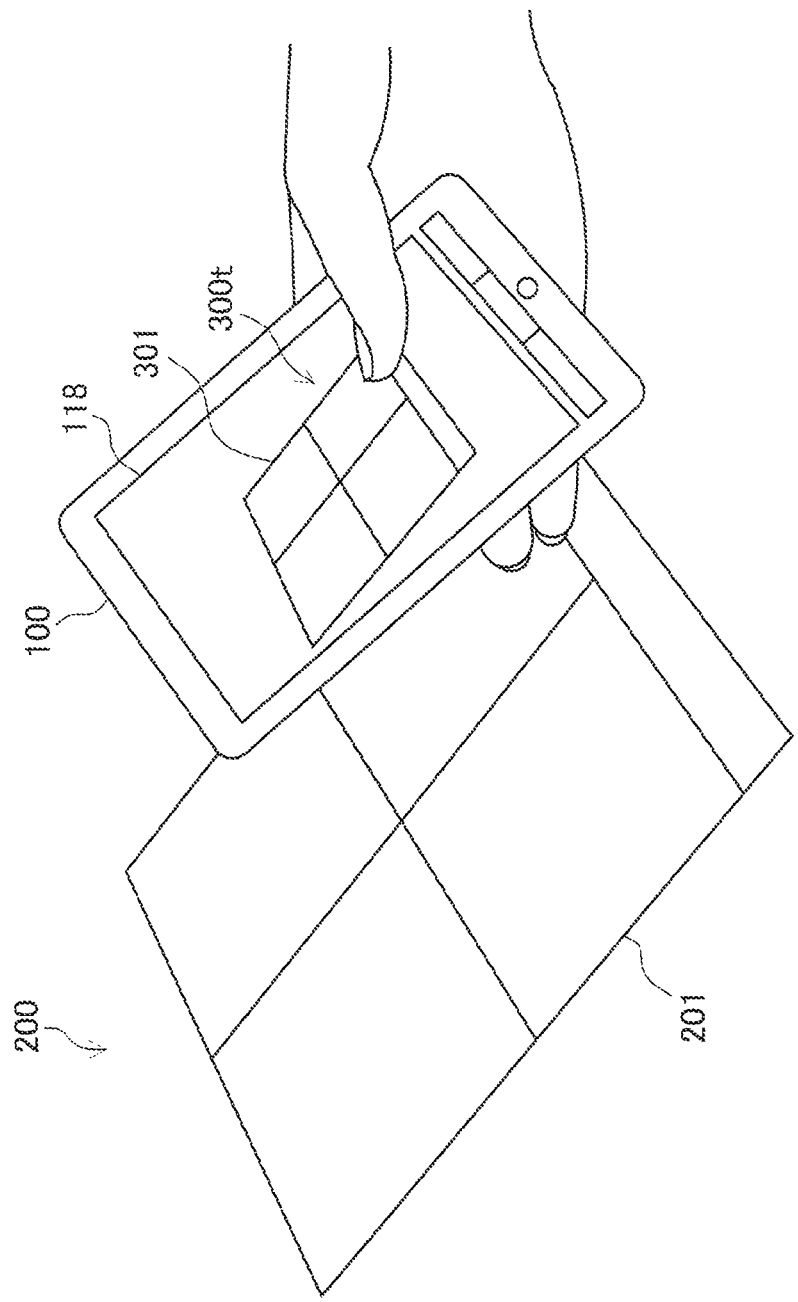
FIG. 1 is a diagram illustrating an overview of the configuration of a device in an embodiment of the present disclosure.

FIG. 1 is a diagram illustrating an overview of the configuration of a device in an embodiment of the present disclosure. Referring to FIG. 1, in the present embodiment, a smartphone 100 captures a real space 200 that includes an object 201. A through-the-lens image 300t, which is generated by the image capturing, is displayed on a display unit 118 of the smartphone 100. The through-the-lens image 300t includes an object 301 that corresponds to the real object 201.

Figure 2:
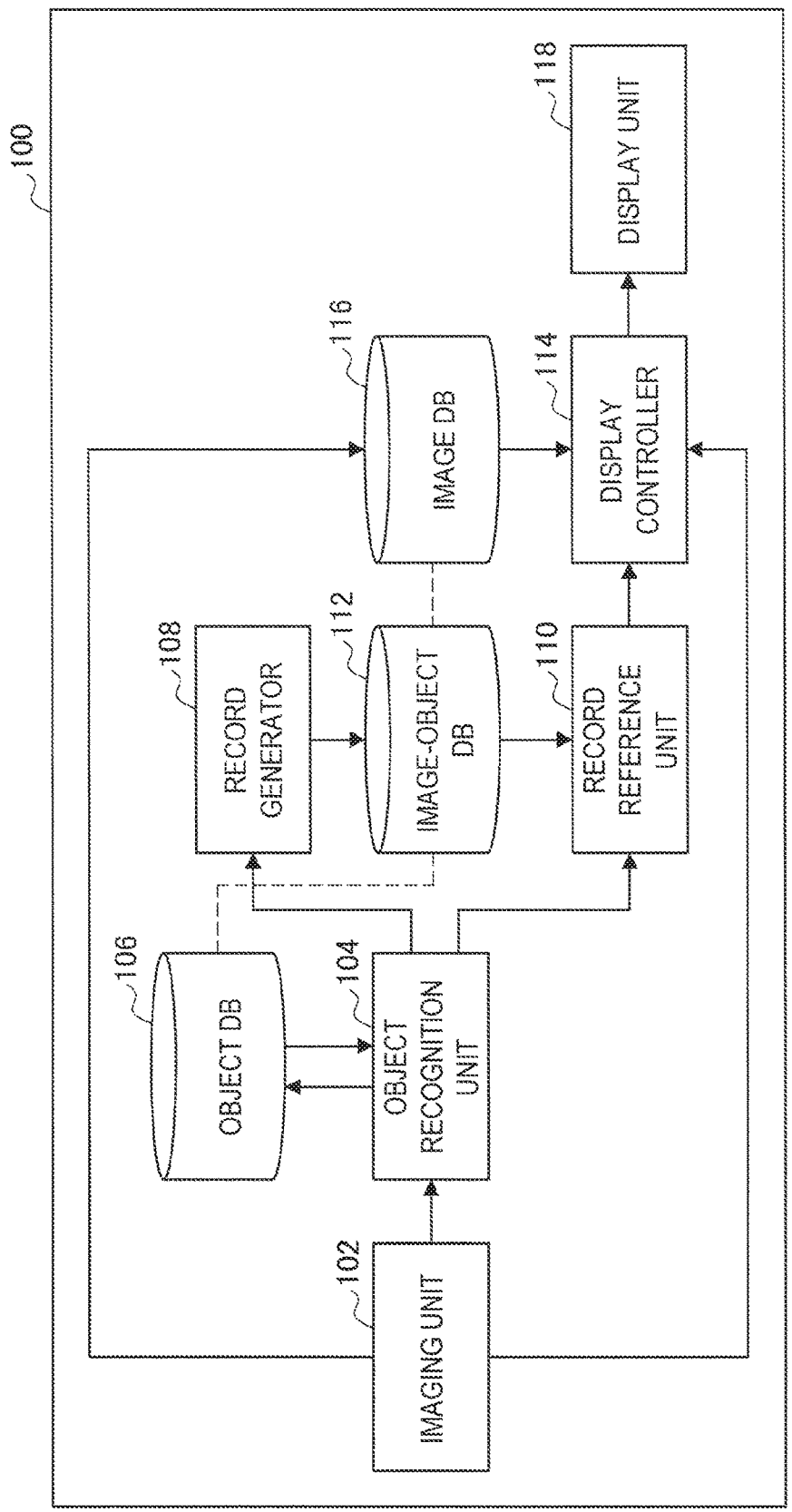
FIG. 2 is a block diagram illustrating the schematic configuration of a smartphone according to an embodiment of the present disclosure.

FIG. 2 is a block diagram illustrating a schematic configuration of a smartphone according to an embodiment of the present disclosure. Referring to FIG. 2, the smartphone 100 is configured to include an imaging unit 102, an object recognition unit 104, an object DB 106, a record generator 108, a record reference unit 110, an image-object DB 112, a display controller 114, an image DB 116, and a display unit 118. The smartphone 100 is an example of a display control device according to an embodiment of the present disclosure, and may be implemented by the hardware configuration of an information processing apparatus described later. In the following, the respective components will be further described.

In the present embodiment, the smartphone 100 is configured to include at least a processor such as central processing (CPU), a memory or storage, a camera (imaging device), and a display (output device). For example, the object recognition unit 104, the record generator 108, the record reference unit 110, and the display controller 114 may be implemented as a processor to be executed in accordance with a program stored in the memory or storage. The object DB 106, the image-object DB 112, and the image DB 116 may be implemented as the memory or storage. The imaging unit 102 may be implemented as a camera. The display unit 118 may be implemented as a display.

The imaging unit 102 captures a real space and generates an image. The imaging unit 102 may generate a still image or may generate a moving image. The image data generated by the imaging unit 102 is supplied to the object recognition unit 104, and is stored in the image DB 116 as necessary. In addition, the image data may be supplied to the display controller 114 for displaying it on the display unit 118 as a through-the-lens image or a preview image.

The object recognition unit 104 executes the object recognition on the image generated by the imaging unit 102. The object recognition unit 104 may refer to the object DB 106 for execution of the object recognition. The object DB 106 previously accumulates, for example, model data that is related to the shape or appearance of an object to be recognized. The model data includes data used to define the shape of each object, image data such as a predefined symbol mark or text label attached to each object, feature amount set data that is extracted from a known image for each object, or the like.

More specifically, for example, the object recognition unit 104 uses the image generated by the imaging unit 102 as an input image to recognize an object to be included in the input image. The object recognition unit 104 checks a feature point set that is extracted from the input image, for example, by comparing it with the shape of an object defined by the model data. In addition, the object recognition unit 104 may check the image data such as a symbol mark or text label defined by the model data by comparing it with the input image. Furthermore, the object recognition unit 104 may check the feature amount of the image of a known object defined by the model data by comparing it with the feature amount extracted from the input image.

In this regard, when a known object is recognized in a new input image, the object recognition unit 104 may add a feature amount set that represents the recognized object as the feature amount set data extracted from the known image for the object. In addition, when a new object is recognized in a new input image, the object recognition unit 104 may add new model data to the object DB 106 based on the shape, image data, feature amount, or the like of the recognized object.

Furthermore, the object recognition unit 104 can recognize the position in which an object is displayed and the orientation of the object in an image. More specifically, for example, the object recognition unit 104 uses the image generated by the imaging unit 102 as an input image and thus detects the position in which an object included in the input image is displayed and the orientation of the object. For example, the orientation of the object is represented in an integrated manner by one homogeneous transformation matrix with four rows and four columns, which indicates the transformation between the model coordinate system for the model data stored in the object DB 106 and the coordinate system of the object visible on the input image. The object recognition unit 104 can extract the angle of the object with respect to the smartphone 100 from the homogeneous transformation matrix. In addition, the position in which an object is displayed in the image can be represented, for example, by the center coordinate of the object in the image.

Figure 3:
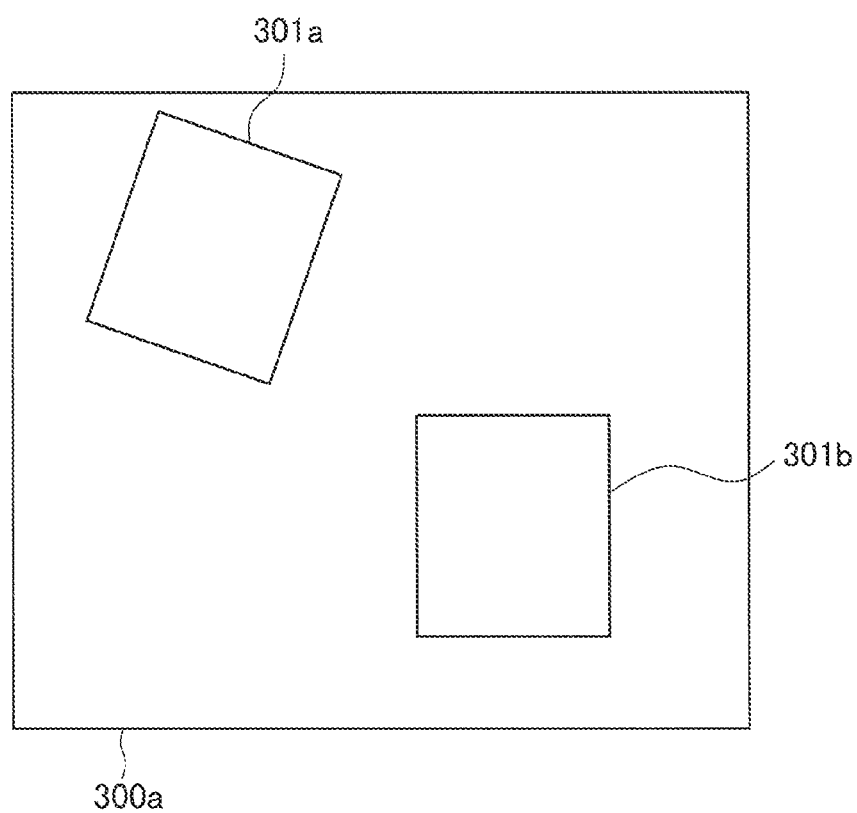
FIG. 3 is a diagram illustrating an example of an image generated by an imaging unit in an embodiment of the present disclosure.

The record generator 108 generates a record in the image-object DB 112 based on a result obtained from the object recognition by the object recognition unit 104. For example, a record in which an image, an object included in the image, and the position in which the object is displayed in the image or the orientation of the object are associated with one another is generated in the image-object DB 112. For example, as shown in FIG. 3, when the object recognition unit 104 recognizes two objects 301a and 301b in an image 300 generated by the imaging unit 102, the record generator 108 adds a record shown in FIG. 4 to the image-object DB 106.

FIG. 4 is a diagram illustrating an example of a record generated in the image-object DB in an embodiment of the present disclosure. FIG. 4 illustrates the record that includes an image ID, an object ID, a position, and an orientation as a record to be generated in the image-object DB 112. In the illustrated example, the record is unique to the combination of the image ID and the object ID. As described above, in the example illustrated in FIG. 3, the object recognition unit 104 recognizes two known objects 301a and 301b in the image 300a generated by the imaging unit 102. Thus, the record generator 108 adds two records 401a and 401b shown in FIG. 4 to the image-object DB 112.

For example, the record 401a is a record for the object 301a (object ID=obj_000001) that is included in the image 300a (image ID=img_000001). The record 401a records the object 301*a* included in the image 300*a*, the position in which the object 301*a* is displayed in the image 300*a* (coordinates in the image (X,Y)=(0.276,0.843)), and the orientation of the object 301*a* in the image 300*a* (to be represented by homogeneous transformation matrix $M_1$) in association with one another.

As described above, the record in the image-object DB 112 is unique to the combination of the image ID and the object ID. Thus, as illustrated, when a plurality of objects 301*a* and 301*b* are found in the same image 300*a*, a plurality of records 401*a* and 401*b* corresponding to each of the objects may be generated. Furthermore, when at least one of the object 301*a* or the object 301*b* is found in another image 300*b*, a new record 401 is additionally generated.

Referring again to FIG. 2, the record reference unit 110 refers to the record in the image-object DB 112 based on a result obtained from the object recognition by the object recognition unit 104. What is referred to is a record for another image that includes an object recognized by the object recognition unit 104. In other words, as the examples of FIG. 3 and FIG. 4 described above, when the object 301*a* is recognized in the image 300*a*, the record reference unit 110 refers to the record for an image that includes the object 301*a* as an image other than the image 300*a*. For example, the record reference unit 110 may refer to the record by issuing a query of "image ID≠img_000001 AND object ID=obj_000001" in the image-object DB 112 that includes records as shown in FIG. 4.

Alternatively, the record reference unit 110 may refer to a record of the image-object DB 112 in response to a request of the display controller 114. For example, what is referred to is a record for an image that includes an object specified by the display controller 114. For example, when the records as illustrated in FIG. 4 are generated in image-object DB 112, the record reference unit 110 can specify the object ID and refer to the record, thereby collectively acquiring records for a plurality of images that include the specified object.

The display controller 114 controls the display of an image on the display unit 118. For example, the display controller 114 may cause the image generated by the imaging unit 102 (hereinafter also referred to as a captured image) to be displayed on the display unit 118 as a through-the-lens image or a preview image. In addition, for example, the display controller 114 may read out an image stored in the image DB 116 (hereinafter referred to as a recorded image) and may display the image on the display unit 118, in response to the operation performed by the user of the smartphone 100. In this case, the display controller 114 may process the captured image or the recorded image as necessary for displaying. In the present embodiment, for the captured image or recorded image, for example, an object included in the image is recognized by the object recognition unit 104. Thus, it is also possible for the display controller 114 to change the position in which an object included in the captured image or the recorded image is displayed (or may move the image itself) or to change the orientation of the object.

For example, the display controller 114 may perform a transition from the display of a first image (a captured image or recorded image) that includes an object to the display of a second image (a recorded image different from the first image) that includes the same object. In this case, the display controller 114 can perform the transition of the display of the image while maintaining the position in which an object is displayed or the orientation of the object, for example, by changing the position in which the object is displayed in the first image or the second image or the orientation of the object.

Such a display may be achieved, for example, by allowing the display controller 114 to specify the second image at the transition destination (image that includes the same object as the first image and is stored in the image DB) and further to recognize the position in which an object included in the second image is displayed and the orientation of the object, based on the record referred to by the record reference unit 110. For the first image, the display controller 114 recognizes the displayed position and orientation based on a result obtained from the object recognition by the object recognition unit 104 (when the first image is a captured image) or another record acquired by the record reference unit 110 (when the first image is a recorded image).

The image generated by the imaging unit 102 is stored, for example, in the image DB 116 in response to the operation performed by the user of the smartphone 100. In addition, the image DB 116 may store an image acquired from an external device (not shown) via a network. The image DB 116 may store a content entity of an image or may store information on a link to the content entity of an image.

In this regard, in order to enable the process by the record reference unit 110 and the display controller 114 as described above, it is preferable for an image ID assigned to the image stored in the image DB 116 and an image ID in the image-object DB 112 to be common to or transformable into each other. Similarly, it is preferable for an image ID assigned to the model data stored in the object DB 106 and an object ID in the image-object DB 112 to be common to or transformable into each other.

The configuration of the device in an embodiment of the present disclosure has been described above. Although the smartphone is illustrated as the display control device in the above example, the embodiment of the present disclosure is not limited thereto. For example, the display control device may be any of various types of equipment provided with a display and an input device, such as a desktop or notebook personal computer, a television, a tablet terminal, a media player, and a game console. The display control device is not necessarily provided with an imaging unit. For example, the display control device may acquire an image that is shared via a dedicated network, or may acquire an image accumulated in memory storage, for example, by reading from a removable medium.

In addition, as another configuration of the device in an embodiment of the present disclosure, at least some components of the configuration described above may be implemented in a server on a network. For example, the smartphone 100 (or other terminal devices) includes the imaging unit 102 and the display unit 118, and other components such as the object recognition unit 104, the object DB 106, the record generator 108, the record reference unit 110, the image-object DB 112, the display controller 114, and the image DB 116 may be implemented in a server on a network. In this case, the server is an example of the display control device. In addition, as a configuration of the device similar to that described above, some or all of the object DB 106, the image-object DB 112, and the image DB 116 may be implemented in memory storage on a network.

(2. Display Example)

(2-1. Change in Position or Orientation in which Object is Displayed)

Figure 5:
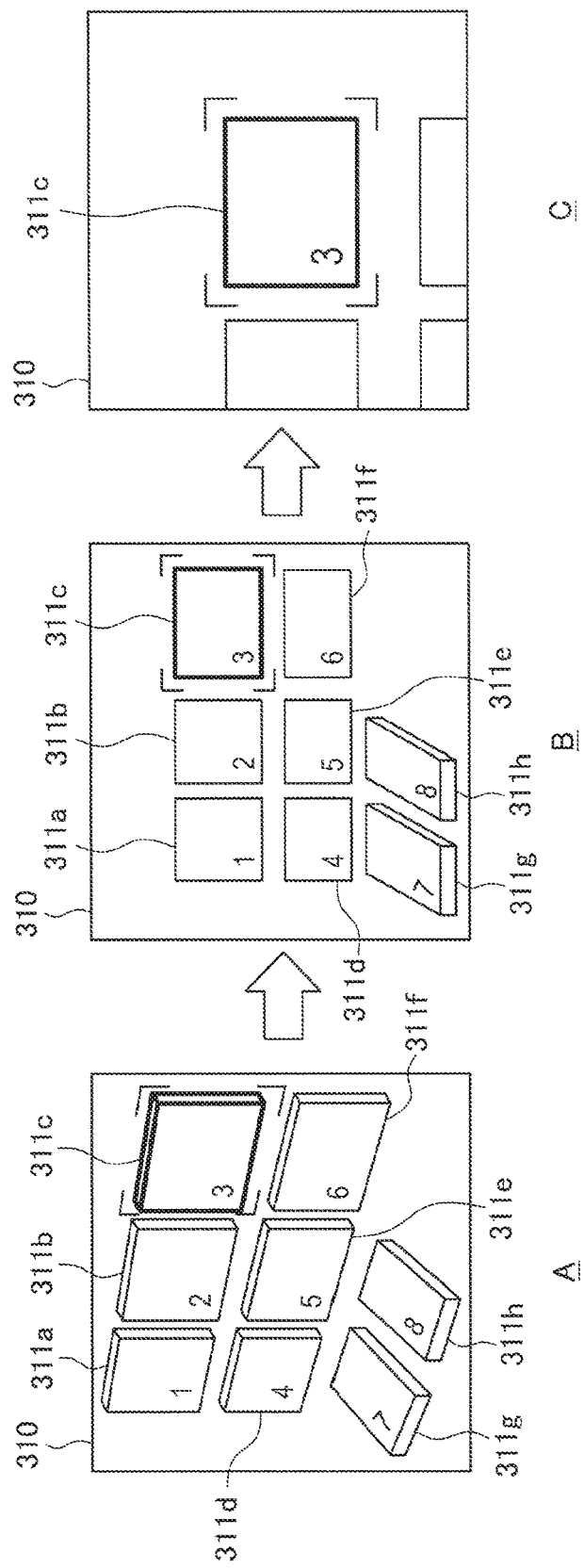
FIG. 5 is a diagram illustrating a first display example in an embodiment of the present disclosure.

FIG. 5 is a diagram illustrating a first display example in an embodiment of the present disclosure. In this display example, as first shown in the portion A, an image 310 that includes objects 311a to 311h is illustrated. In this regard, when the user specifies the object 311c through an operation (e.g. double tap or the like) on a touch panel or the like, the object 311c is highlighted and the orientations of the objects 311a to 311h are changed while maintaining their mutual positional relationship, and then the object 311c is positioned to face straight ahead on the screen, as shown in the portion B. Furthermore, as shown in the portion C, the object 311c, which is facing straight ahead, is displayed in an enlarged state by zooming in the image 310 centering on the object 311c.

Figure 6:
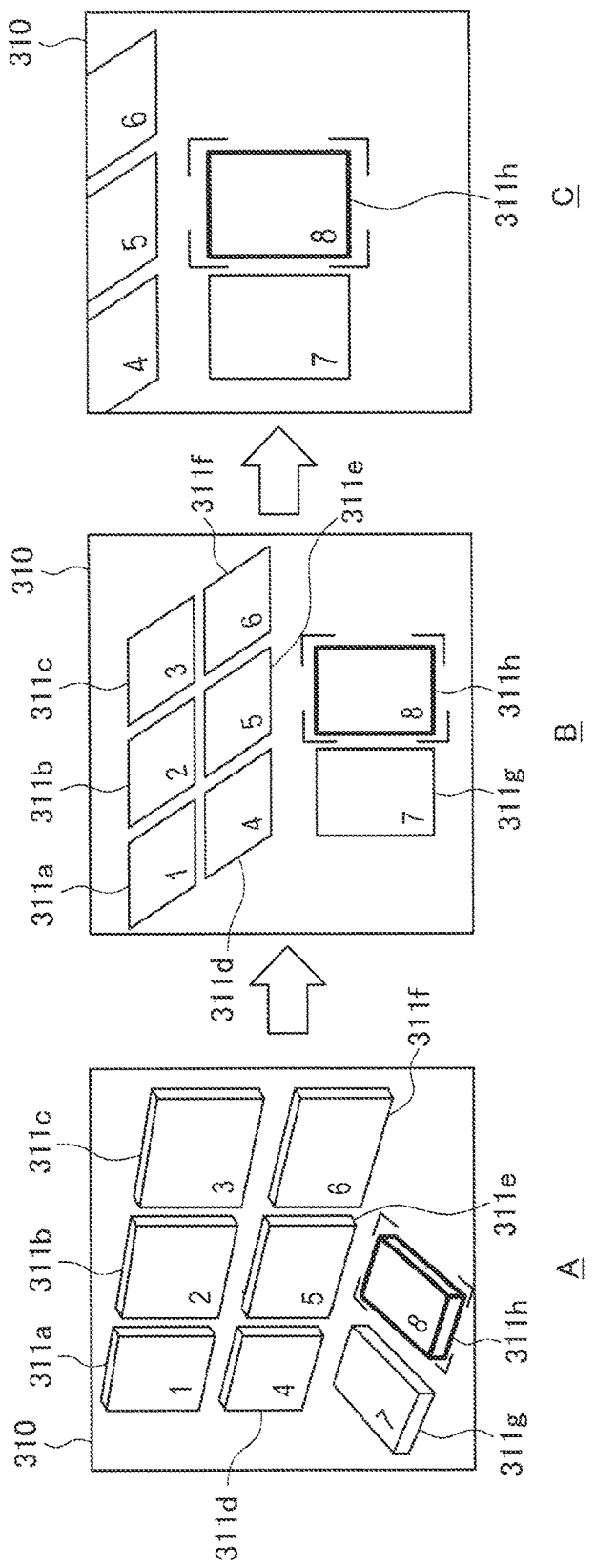
FIG. 6 is a diagram illustrating a second display example in an embodiment of the present disclosure.

FIG. 6 is a diagram illustrating a second display example in an embodiment of the present disclosure. In this display example, as first shown in the portion A, an image 310 that includes objects 311a to 311h is displayed (similar to FIG. 5). In this regard, when the user specifies the object 311h through an operation (e.g. double tap or the like) on a touch panel or the like, the object 311h is highlighted and the orientations of the objects 311a to 311h are changed while maintaining their positional relationship, and then the object 311c is positioned to face straight ahead, as shown in the portion B. Furthermore, when a further predetermined operation (e.g. drag, pinch, double tap, or the like) is performed on the object 311h in this state, the object 311h, which is facing straight ahead, is enlarged by zooming in the image 310 centering on the object 311h, as shown in the portion C.

As shown in the two examples described above, in the present embodiment, it is possible to allow the object specified in the image to face straight ahead on the screen by changing the orientation of the object, to move the range over which the image is displayed so that the specified object is displayed in the center, or to zoom in the image so that the specified object is displayed in an enlarged state.

Such a change in the display can be achieved by allowing the display controller 114 to process the image acquired from the imaging unit 102 or the image DB 116 based on a record in the image-object DB 112 that is referred to by the record reference unit 110 (a record in which an image, an object included in the image, and the position in which the object is displayed in the image or the orientation of the object are associated with one another).

More specifically, for example, the display controller 114 transforms an image corresponding to each object so that the respective objects are positioned to face straight ahead on the image, based on information indicating the orientation of each object included in the image. In addition, the display controller 114 rearranges the respective transformed objects so that their positional relationship before the transformation is reproduced, based on information indicating the position in which each object is displayed in the image. Furthermore, the display controller 114 moves the range over which the image is displayed so that the specified object is displayed in the center or zooms in the image so that the specified object is enlarged, based on the information indicating the position in which each object is displayed in the image.

(2-2. Transition Between Images)

Figure 7:
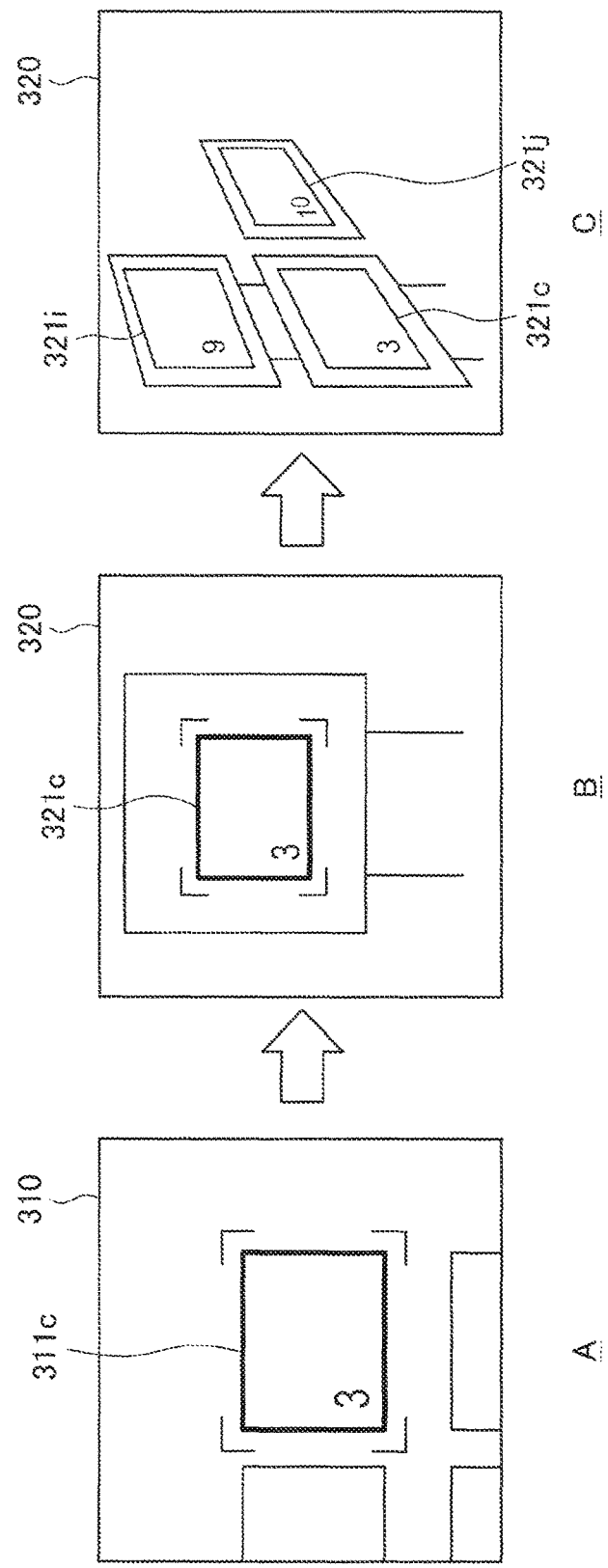
FIG. 7 is a diagram illustrating a third display example in an embodiment of the present disclosure.

FIG. 7 is a diagram illustrating a third display example in an embodiment of the present disclosure. In this display example, as first shown in the portion A, the object 311c is displayed facing straight ahead in an enlarged state on the image 310 (a first image). This display may be, for example, those that are displayed through a series of display cases described above with reference to FIG. 5. In this regard, a transition of the display is performed from the image 310 to another image 320 (a second image) automatically or in response to a predetermined operation by the user, as shown in the portion B. The image 320 includes an object 321c. The object 321c is the same object as the object 311c (i.e., it is recorded in the image-object DB 112 using the same object ID). As illustrated in the portion C described later, the image 320 includes objects 321i and 321j in addition to the object 321c.

In this case, the position in which the objects 311c and 321c are displayed and the orientation of the objects are maintained throughout the display of the image 310 shown in the portion A and the display of the image 320 shown in the portion B. In other words, the object 311c is arranged adjacent to the center facing straight ahead in the image 310 of the portion A, and the object 321c is also arranged adjacent to the center facing straight ahead in the image 320 of the portion B. Then, automatically or in response to a predetermined operation by the user, the display of the image 320 is changed to the state in which the object 311c does not face straight ahead and also is not displayed in the center, as shown in the portion C. In the illustrated example, this is the original state of the image 320. In other words, in the portion B, the image 320 is processed and then displayed so that the orientation of the object 311c and the position in which the object 311c is displayed in the image 310 before the transition is maintained even in the object 321c displayed after the transition.

In this way, in the present embodiment, the display controller 114 can change the orientation of an object in the display of the first image to a predetermined orientation (e.g. facing straight ahead) and can maintain at least temporarily a predetermined orientation even after the transition to the display of the second image, thereby seamlessly representing the transition between images that include the same object. Thus, it is possible to perform the transition of the display from the image 310 that includes the objects 311a to 311h to the image 320 that includes the objects 321c, 321i, and 321j, for example, by the medium of the objects 311c and 321c, thereby obtaining new information for the objects 321i and 321j that are not included in the image 310.

For example, in the example of FIG. 7 described above, the transition to another image that includes the same object as the object 321j may be performed by selecting the object 321j this time in the state shown in the portion C. In the present embodiment, in this way, it is possible to form a link of information between objects or images by a new context by repeating the transition of an image by the medium of an object while changing a target object as necessary.

As another example, in the display of the image 310 (the first image), the display controller 114 may change the position in which the object 311c is displayed and the orientation of the object 311c to the position and orientation that are similar to those of the object 321c in the display in the original state (state illustrated in the portion C of FIG. 7) of the image 320 (the second image), and then may perform the transition of the display from the image 310 to the image 320. On the other hand, the display controller 114 does not change the position in which the object 311c is displayed and the orientation of the object 311c (without facing straight ahead or zooming in as shown in FIG. 5) in the display of the image 310 (the first image). Alternatively, the display controller 114 may change the position in which the object 321c is displayed and the orientation of the object 321c in the display of the image 320 to the position and orientation that are similar to those of the object 311c in the display of the image 310, and then may execute the transition.

Figure 8:
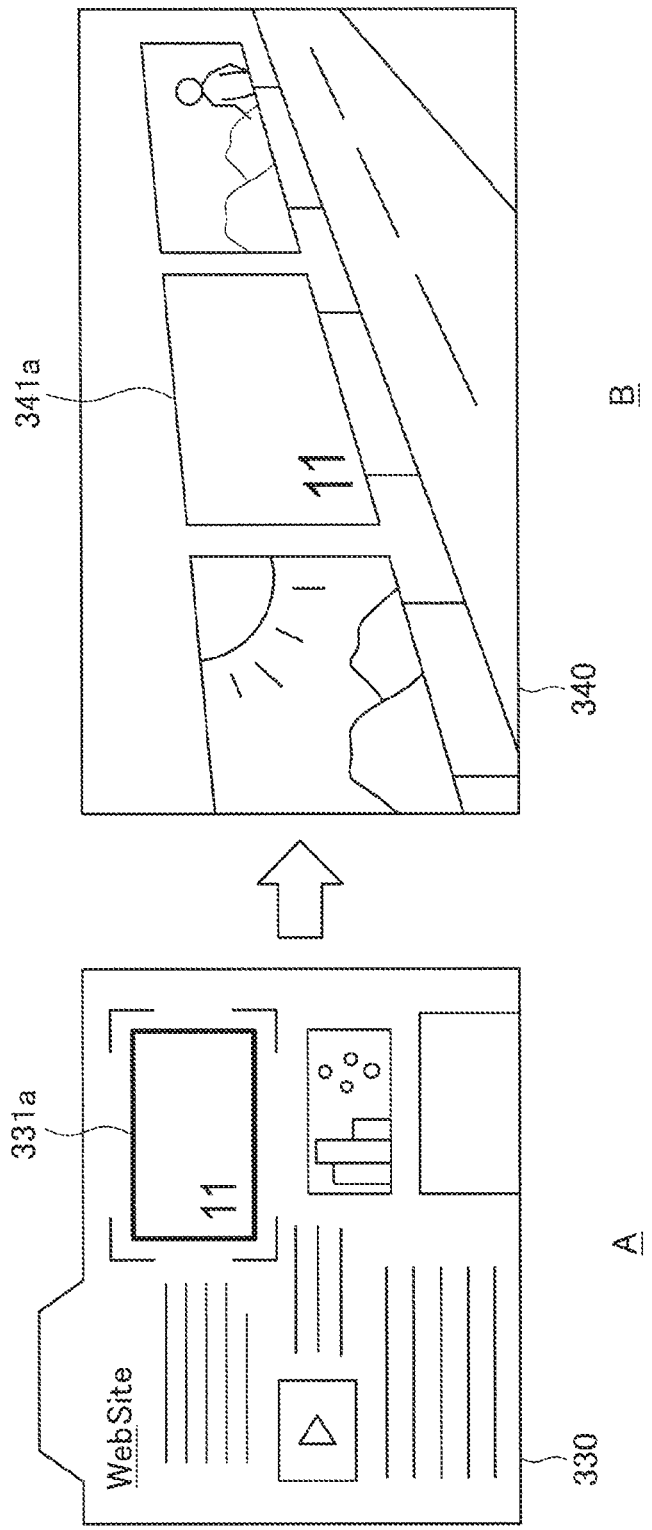
FIG. 8 is a diagram illustrating a fourth display example in an embodiment of the present disclosure.

FIG. 8 is a diagram illustrating a fourth display example in an embodiment of the present disclosure. In this display example, as first shown in the portion A, an image 330 (a web page) that includes an object 331*a* represented as a graphic is displayed. In this state, for example, the transition of the display from the image 330 to another image 340 (photograph) is performed as shown in the portion B by allowing the user to specify the object 331*a* to execute a predetermined operation. The image 340 includes a photographic object 341*a*. The object 341*a* is the same object as the object 331*a* (i.e., to be recorded in the image-object DB 112 using the same object ID).

In this way, in the present embodiment, the images before and after the transition may be any of a virtually created image such as web pages or a captured image (photograph). As the display example described above, the transition may be executed mutually between the virtually created image (a web page) and the captured image (photograph), or the transition may be executed between the virtually created images or between the captured images. In addition, although not shown in FIG. 8, even in this example, either or both of the images 330 and 340 may be processed so that the position in which the objects 331*a* and 341*a* are displayed or the orientation of the objects 331*a* and 341*a* are maintained before and after the transition.

(2-3. Display of Annotation)

Figure 9:
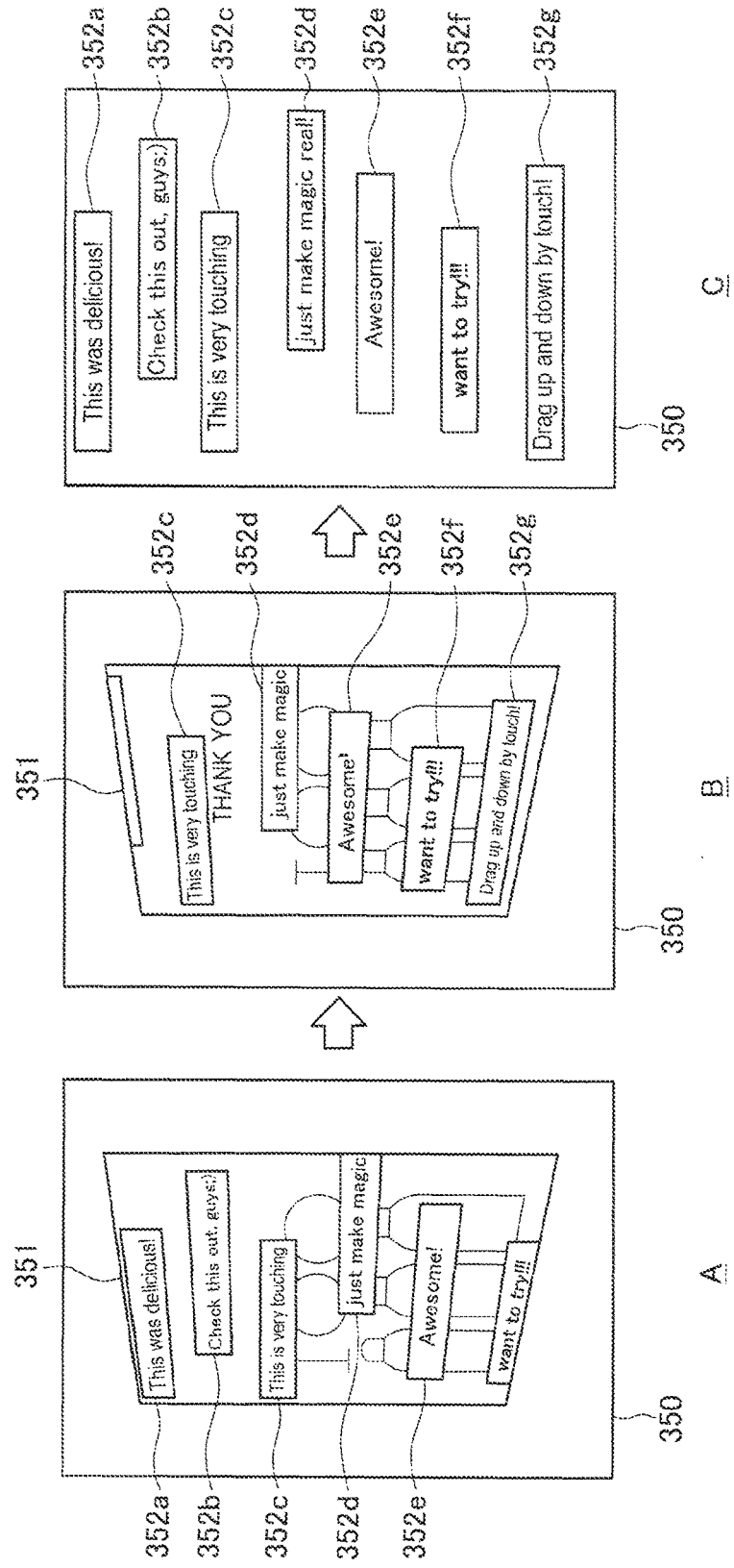
FIG. 9 is a diagram illustrating a fifth display example in an embodiment of the present disclosure.

FIG. 9 is a diagram illustrating a fifth display example in an embodiment of the present disclosure. In this display example, as shown in the portion A, annotation 352, which is assigned by a plurality of users, is displayed in association with an object 351 (a poster) included in an image 350 in a cumulative manner. Although the annotation can also be treated as an object, the object 351 and the annotation 352 are distinguished from each other in this example for the purpose of description. As shown in the portion B, the annotation 352 can be scrolled and displayed while maintaining the orientation displayed by being superimposed on the object 351 (annotations 352*a* to 352*e* are displayed in the portion A, while annotations 352*c* to 352*g* are displayed in the portion B). In addition, as shown in the portion C, it is also possible to display the annotation 352 to be independent of the object 351 while facing straight ahead.

Such a display can be achieved in the present embodiment by allowing the annotation 352 inputted to the same object 351 included in the respective different images 350 by a plurality of users to be recorded along with the relative positional relationship with respect to the object 351 in the respective images 350. An example of the process for such a display will be further described below with reference to FIG. 10.

Figure 10:
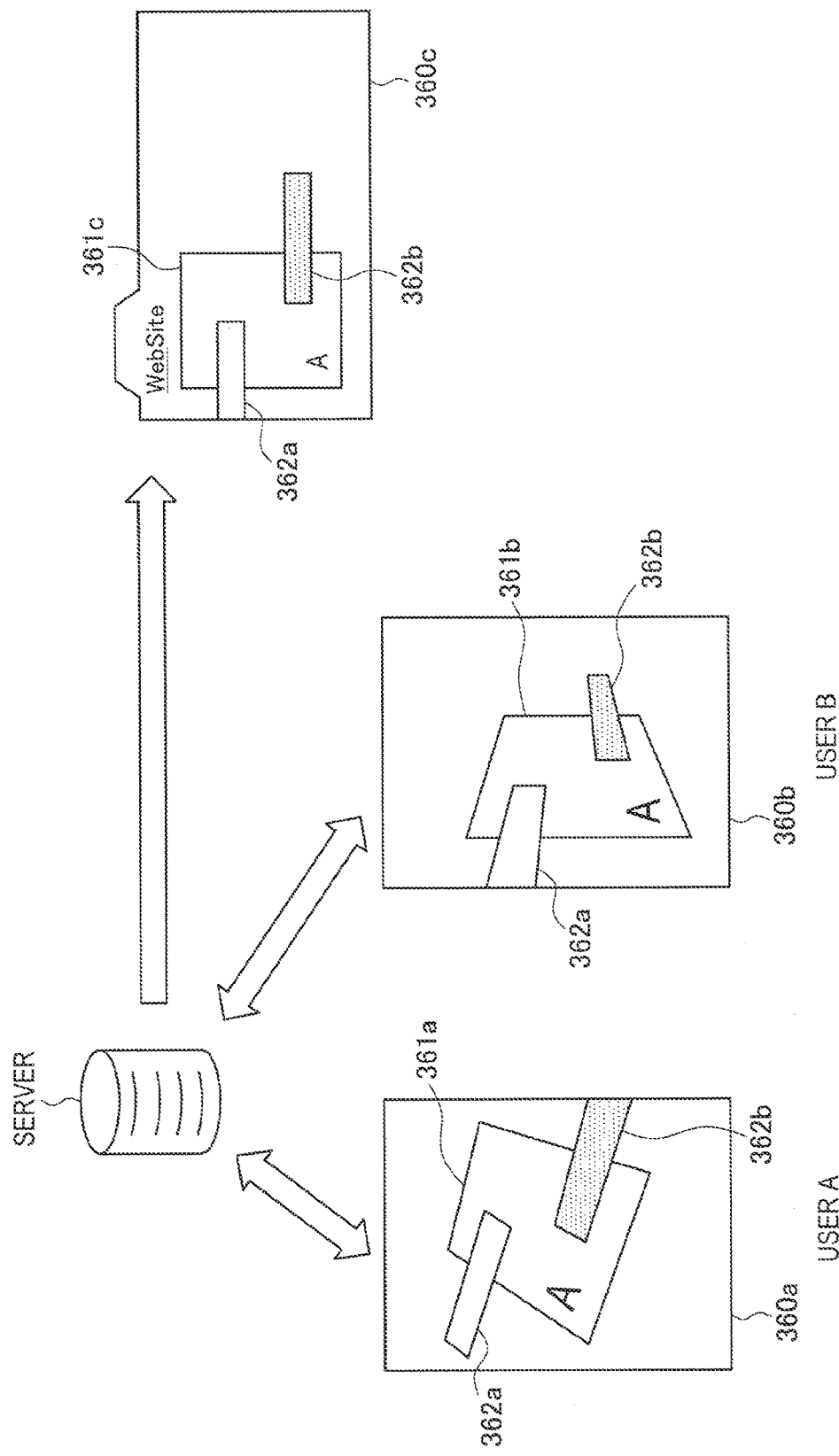
FIG. 10 is a diagram illustrated to describe an example of a process for displaying an annotation in an embodiment of the present disclosure.

FIG. 10 is a diagram illustrated to describe an example of the process of displaying an annotation in an embodiment of the present disclosure. In the illustrated example, a user A inputs an annotation 362*a* to an object 361*a* that is included in an image 360*a*. In this example, the annotation 362*a* is recorded, for example, depending on an object ID of the object 361*a*, a relative position of the annotation 362*a* with respect to the object 361*a*, a relative angle of the annotation 362*a* with respect to the object 361*a*, and the contents (text or image) of the annotation 362*a*.

On the other hand, another user B refers to another image 360*b* that includes an object 361*b* that is the same as the object 361*a*. The object 361*b* is displayed in the image 360*b* with the position and orientation that are different from those of the object 361*a* in the image 360*a*, but the object 361*b* can be associated with the object 361*a*, for example, by allowing it to be recorded in the image-object DB 112 using the same object ID. Furthermore, the annotation 362*a*, which is inputted by the user A, is recorded along with the relative position or angle with respect to the object 361*a*, and thus it is also possible to display the annotation 362*a* in the image 360*b* on the basis of the object 361*b*.

More specifically, the display controller 114 can calculate a difference between the position in which the object 361*a* is displayed in the image 360*a* and its orientation and the position in which the object 361*b* is displayed in the image 360*b* and its orientation based on the record of the image-object DB that is acquired by the record reference unit 110, and can add the calculated difference to the relative position or angle of the annotation 362*a* with respect to the object 361*a*, thereby displaying the annotation 362*a* in the image 360*b* on the basis of the object 361*b*.

In this regard, the user B may input an additional annotation 362*b* to the object 361*b* that is included in the image 360*b*. Similarly to the annotation 362*a*, the annotation 362*b* is also recorded depending on an object ID of the object 361*b* (same as the object 361*a*), a relative position of the annotation 362*b* with respect to the object 361*b*, a relative angle of the annotation 362*b* with respect to the object 361*b*, and the contents (text or image) of the annotation 362*b*. This allows the annotation 362*b* to be displayed in the image 360*a* that is referred to by the user A on the basis of the object 361*a*, as illustrated.

Moreover, the annotation inputted by each of the users A and B may be displayed in an image 360*c* (a web page) that is referred to by another user C. In this case, any of the object 361*c* and the annotations 362*a* and 362*b* may be displayed in the image 360*c* while facing straight ahead.

The process for the display of the object 361 and the annotation 362 as described above may be executed, for example, in a server for providing a service to the users A, B, and C on a network. In other words, in this case, the server on a network may be an example of the display control device.

(2-4. Display of Options of Transition Destination)

Figure 11:
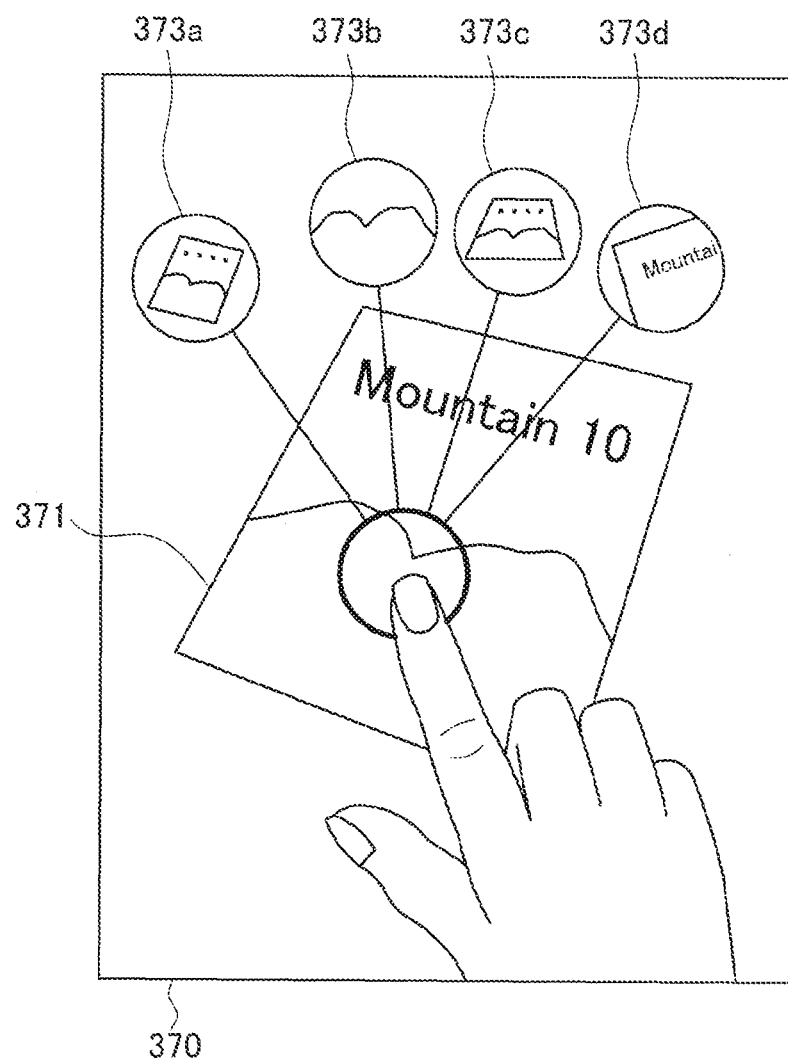
FIG. 11 is a diagram illustrating a sixth display example according to an embodiment of the present disclosure.

FIG. 11 is a diagram illustrating a sixth display example in an embodiment of the present disclosure. In this display example, an option icon 373 of an image a transition to which can be performed by the medium of an object 371 is displayed in an image 370. In other words, in the illustrated example, a plurality of images that include the same object as the object 371 are stored in the image DB 116, and it is possible to allows the user to select a destination of each of the images using the option icon 373. In the illustrated example, four option icons 373*a* to 373*d* are displayed.

The option icon 373 is displayed, for example, when the user executes a predetermined operation (e.g. long press) on the object 371 through a touch panel or the like. The user's selection of any of the plurality of option icons 373 allows a transition from the image 370 to a corresponding image to be performed. Even in the transition of this case, the position in which the object 371 is displayed or its orientation may be maintained between the image 370 before the transition and an image after the transition.

In this example, as the option icon 373, for example, a predetermined number of images that are selected randomly among images a transition to which can be performed may be displayed. Alternatively, as the option icon 373, an image that is selected under a predetermined condition may be displayed. In the illustrated example, an image having the highest resolution, an image having the highest degree of recommendation, an image captured at a location that is closest to the shooting location of the image 370, and an image having the highest evaluation by the other user are displayed in the option icon 373*a*, the option icon 373*b*, the option icon 373*c*, and the option icon 373*d*, respectively.

As the example described above, when an image to be displayed as the option icon 373 is determined based on attributes such as resolution, degree of recommendation, shooting location, or other user's evaluation, information indicating the attribute of each image is stored, for example, in the image DB 116 in association with the respective corresponding image IDs.

In this way, an image a transition to which can be performed by the medium of the object 371 included in the image 370 is displayed as the option icon 373, and thus the user can access the desired information using the transition of images more easily.

According to some display examples of the embodiments of the present disclosure ad described above, it is possible to achieve an application that regards the state in which a plurality of objects are present in the same location as one context and shares this state.

As one example, when the transition from an image obtained by capturing a book placed on a desk by the user to another image that includes the same book as an object is executed, the transition to an image of a book arranged in a bookcase at a bookstore (may be an image that is captured by another user and is shared on a network) allows the context of which book is selected as a book associated with the imaged book to be understood.

Furthermore, when the sequential transition to an image in which the books are arranged in a plurality of stores, offices, personal bookcases, and so on is performed, it is possible to obtain information about another book associated with the book, which is selected from various viewpoints. For such transition, the execution of a seamless transition while maintaining the position in which an object (book) is displayed or its orientation allows the user to recognize easily that the display of the image is executed by the medium of the object (book).

Furthermore, for example, when the user's viewpoint images are continuously recorded using a camera or the like mounted on a wearable display worn by the user, an enormous amount of images may be recorded. For example, when the user feels like that such an certain object have been seen somewhere, but the user does not remember where it is, a sample image of the object can be captured and the same object as the object included in the sample image can be retrieved and displayed, thereby exactly reminding the user of the user's situation when viewing the object. In addition, when the viewpoint image is shared over a network, another user can access the user's viewpoint image by the medium of an object.

In the description of the above embodiments and display examples, both the position in which an object is displayed and the orientation of the object upon the transition of an image are maintained, but the embodiments of the present disclosure are not limited thereto. At the time of transition of an image, only one of the position and the orientation may be configured to be maintained. Even in this case, it is sufficiently possible to allow the user to recognize that the display of an image is executed by the medium of an object. In addition, in this case, a record in which an image, an object that is included in the image, and any one of the position in which the object is displayed and its orientation in the image are associated with one another may be stored in the image-object DB.

(3. Hardware Configuration)

Next, with reference to FIG. 12, a hardware configuration of an information processing apparatus according to an embodiment of the present disclosure will be described. FIG. 12 is a block diagram showing an example of a hardware configuration of an information processing apparatus according to an embodiment of the present disclosure. An information processing apparatus 900 which is shown may achieve the display control device such as the smartphone and the server in the above described embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. Furthermore, the information processing apparatus 900 may include an imaging device 933 and a sensor 935 as necessary. The information processing apparatus 900 may also include, instead of or along with the CPU 901, a processing circuit that is also called a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 929 such as a cell phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker or headphones; or a printer. The output device 917 outputs results obtained by the processing performed by the information processing apparatus 900 as video in the form of text or an image or as audio in the form of audio or sound.

The storage device 919 is a device for storing data configured as an example of a storage unit of the information processing apparatus 900. The storage device 919 is configured from, for example, a magnetic storage device such as a hard disk drive (HDD), a semiconductor storage device, an optical storage device, or a magneto-optical storage device.

This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI, registered trademark) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

The imaging device 933 is a device which images a real space by use of various members including an image sensor such as a charge coupled device (CCD) or a complementary metal oxide semiconductor (CMOS) and a lens for controlling image formation of a subject on the image sensor, and generates a pickup image. The imaging device 933 may image a still image or a moving image.

The sensor 935 is any of various sensors such as an acceleration sensor, a gyro sensor, a magnetic field sensor, an optical sensor, and a sound sensor. For example, the sensor 935 acquires information related to the state of the information processing apparatus 900 itself, such as the orientation of the housing of the information processing apparatus 900, or information related to the peripheral environment of the information processing apparatus 900, such as the brightness or noise around the information processing apparatus 900. Further, the sensor 935 may include a global positioning system (GPS) sensor which measures the latitude, the longitude, and the altitude of the apparatus by receiving a GPS signal.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

(4. Supplement)

The embodiments of the present disclosure may include the display control device (smartphones, servers, or the like) as described above, a system, a display control method executed in the display control device or the system, a program used to allow the display control device to function, and a non-transitory tangible medium having the program recorded thereon.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A display control device including:

a record reference unit configured to refer to a record in which an image, an object included in the image, and a position where the object is displayed or an orientation of the object in the image are associated with one another; and a display controller configured to perform a transition from display of a first image including the object to display of a second image including the object based on the record while maintaining the position where the object is displayed or the orientation of the object, the second image being different from the first image.

(2)

The display control device according to (1), wherein the display controller changes the orientation of the object in the display of the first image to a predetermined orientation and maintains the predetermined orientation at least temporarily even after the transition to the display of the second image.

(3)

The display control device according to (2), wherein the predetermined orientation is an orientation of facing straight ahead.

(4)

The display control device according to (1), wherein the display controller changes the position where the object is displayed or the orientation of the object in the display of the first image to correspond to the position where the object is displayed or the orientation of the object in the display of the second image and then performs the transition from the display of the first image to the display of the second image.

(5)

The display control device according to (1), wherein the display controller performs the transition from the display of the first image to the display of the second image in a manner that the position where the object is displayed or the orientation of the object in the display of the second image is changed to correspond to the position where the object is displayed or the orientation of the object in the display of the first image.

(6) The display control device according to any one of (1) to (5),
wherein at least any one of the first image and the second image is a captured image.

(7) The display control device according to any one of (1) to (6),
wherein at least any one of the first image and the second image is a virtually created image.

(8) The display control device according to any one of (1) to (7),
wherein the display controller allows an option of an image a transition to which can be performed as the second image to be displayed in the first image.

(9) The display control device according to (8),
wherein the display controller allows the option to be displayed for each attribute of the image.

(10) The display control device according to any one of (1) to (8),
wherein the display controller allows an annotation assigned to the object in each of the first image and the second image to be displayed in association with the object in a cumulative manner based on the record.

(11) A display control method including:
referring to a record in which an image, an object included in the image, and a position where the object is displayed or an orientation of the object in the image are associated with one another; and
performing a transition from display of a first image including the object to display of a second image including the object based on the record while maintaining the position where the object is displayed or the orientation of the object, the second image being different from the first image.

(12) A program for causing a computer to execute:
a function of referring to a record in which an image, an object included in the image, and a position where the object is displayed or an orientation of the object in the image are associated with one another; and
a function of performing a transition from display of a first image including the object to display of a second image including the object based on the record while maintaining the position where the object is displayed or the orientation of the object, the second image being different from the first image.

REFERENCE SIGNS LIST 100 smartphone
102 imaging unit
104 recognition unit
108 generator
110 reference unit
114 display controller
118 display unit

The invention claimed is:

1. A display control device, comprising:
a Central Processing Unit (CPU) and a memory configured to store instructions for execution by the CPU, the CPU configured to:
refer to a record that corresponds to a first plurality of objects,
wherein the record includes an association of an image id of a first image, an object id of a first object of the first plurality of objects included in the first image, a first position of the first object in the first image, and a first orientation of the first object in the first image;
control a display screen to display a second image including the first plurality of objects; and
control the display screen to subsequently display a third image including the first object and a second plurality of objects of the first plurality of objects based on the referred record such that, at least one of a second position of the first object and a third position of the first object in the third image are same or a second orientation of the first object in the second image and a third orientation of the first object in the third image are same,
wherein number of the second plurality of objects are less than number of the first plurality of objects, and
wherein the second image is different from the first image.

2. The display control device according to claim 1, wherein the CPU is further configured to:
change the second orientation of the first object in the second image to a fourth orientation, and
control the display screen to temporarily maintain first object in the fourth orientation after transition to the display of the third image.

3. The display control device according to claim 2, wherein the fourth orientation is an orientation that corresponds to a plane parallel to the display screen.

4. The display control device according to claim 1, wherein the CPU is further configured to:
change the second position where the first object is displayed and the second orientation of the first object in the display of the second image to correspond to the third position where the first object is displayed and the third orientation of the first object in the display of the third image, and
control the display screen transition from the display of the second image to the display of the third image.

5. The display control device according to claim 1, wherein the CPU is further configured to control the display screen transition the display of the second image to the display of the third image such that the third position where the first object is displayed and the third orientation of the first object in the display of the third image is changed to correspond to the second position where the first object is displayed and the second orientation of the first object in the display of the second image.

6. The display control device according to claim 1, wherein at least one of the third image or the second image is a captured image.

7. The display control device according to claim 1, wherein at least one of the third image or the second image is a virtually created image.

8. The display control device according to claim 1, wherein the CPU is further configured to allow an option to transition to the third image that is displayed after the display of the second image.

9. The display control device according to claim 8, wherein the CPU is further configured to allow the option to be displayed for each attribute of the second image.

10. The display control device according to claim 1, wherein the CPU is further configured to allow an annotation assigned to the first object in each of the third image and the second image to be displayed in association with the first object in a cumulative manner based on the referred record.

11. A display control method, comprising:
in a display control device comprising a Central Processing Unit (CPU) and a memory configured to store instructions for execution by the CPU:
referring, by the CPU, to a record that corresponds to a first plurality of objects,
wherein the records includes an association of an image id of a first image, an object id of a first object of the first plurality of objects included in the first image, a first position of the first object in the first image, and a first orientation of the first object in the first image;
controlling, a display screen to display a second image including the first plurality of objects; and
controlling the display screen to subsequently display a third image including the first object and a second plurality of objects of the first plurality of objects based on the referred record such that, at least one of a second position of the first object and a third position of the first object in the third image are same or a second orientation of the first object in the second image and a third orientation of the first object in the third image are same,
wherein number of the second plurality of objects are less than number of the first plurality of objects, and
wherein the second image is different from the first image.

12. A non-transitory computer-readable medium having stored thereon, computer-executable instructions for causing a display control device to execute operations, the operations comprising:
referring to a record that corresponds to a first plurality of objects,
wherein the record includes an association of an image id of a first image, an object id of a first object of the first plurality of objects included in the first image, a first position of the first object in the first image, and a first orientation of the first object in the first;
displaying a second image including the first plurality of objects; and
subsequently displaying a third image including the first object and a second plurality of objects of the first plurality of objects based on the referred record such that, at least one of a second position of the first object and a third position of the first object in the third image are same or a second orientation of the first object in the second image and a third orientation of the first object in the third image are same,
wherein number of the second plurality of objects are less than number of the first plurality of objects, and
wherein the second image is different from the first image.

* * * * *